April 8, 1952     L. V. GUILD     2,591,808
METHOD OF MAKING ANALYSIS OF COMPOSITE GAS MIXTURES
Filed Nov. 3, 1948
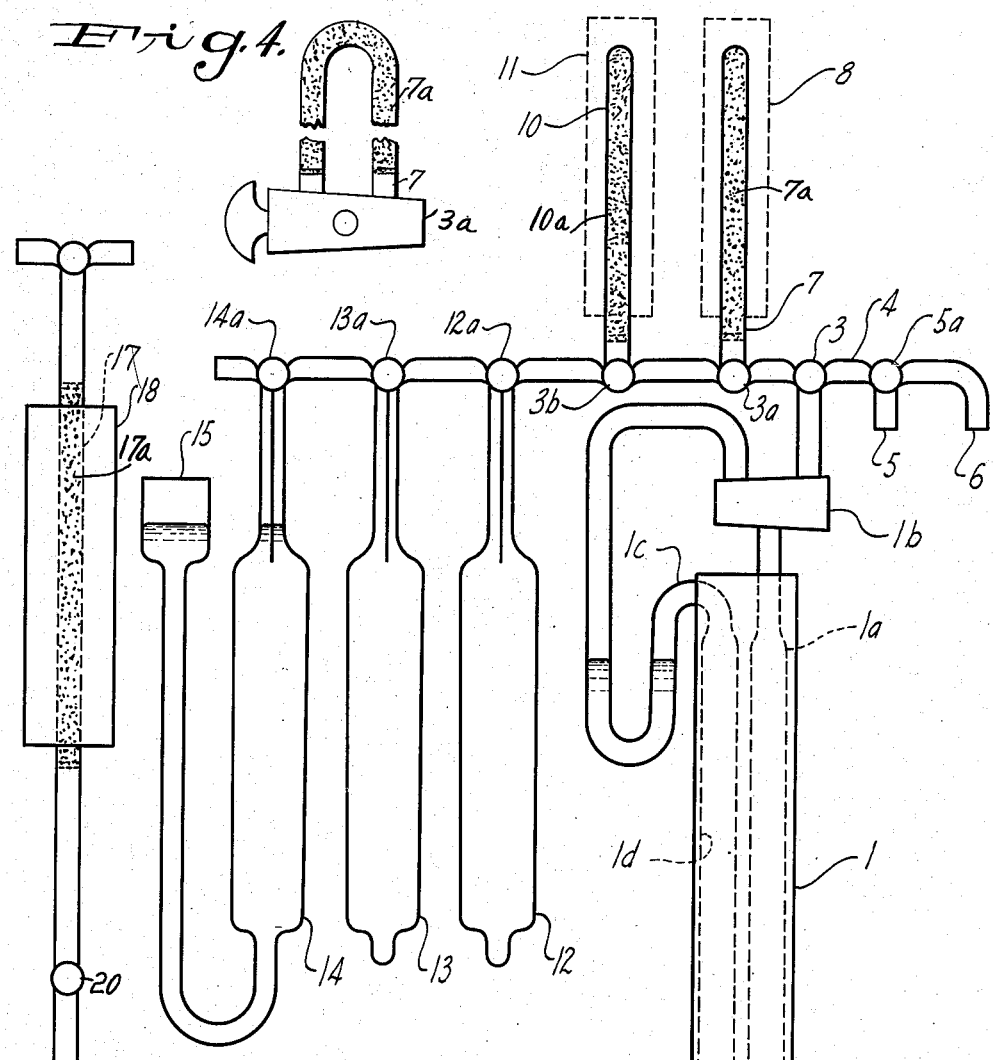
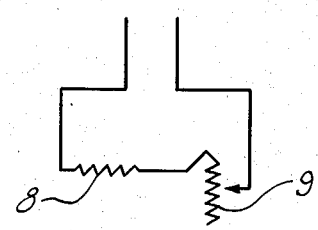
INVENTOR.
Lloyd V. Guild
BY William B. Jaspert
Attorney.

Patented Apr. 8, 1952

UNITED STATES PATENT OFFICE 2,591,808

METHOD OF MAKING ANALYSIS OF COMPOSITE GAS MIXTURES

Lloyd V. Guild, Pittsburgh, Pa., assignor to Burrell Corporation, a corporation of Pennsylvania Application November 3, 1948, Serial No. 58,131

1 Claim. (Cl. 23—232)

This invention relates to the method of and apparatus for making analysis of gas mixtures containing combustible components such as hydrogen, carbon monoxide and hydrocarbons, and the present application is a continuation in part of my now abandoned application Serial No. 593,140, filed May 11, 1945, the latter case being a substitute for an earlier abandoned application Serial No. 461,573, filed October 10, 1942.

It is among the objects of this invention to provide an efficient and speedy method of determining the hydrogen and hydrocarbon content of the gases.

In standard practice in the analysis of gas mixtures containing hydrogen, carbon monoxide and hydrocarbons, the amount of hydrogen and carbon monoxide has been determined at the same time by combustion over copper oxide at 290° to 300° C. At this temperature, in the presence of copper oxide, hydrogen is oxidized to water and carbon monoxide to carbon dioxide. Measure of the hydrogen present is the amount of shrinkage in the gas sample due to the formation of water, the actual volume of the water due to the reaction being of no significance. Percentage of carbon monoxide present is calculated by making a determination of the amount of carbon dioxide formed in the above reaction.

In the use of the copper oxide tube at 300° C., the gas may contain hydrocarbons without the hydrocarbons being affected. The normal practice in determining hydrocarbons has been to pass them to a pipette called a slow combustion pipette containing oxygen and a hot platinum wire. In this pipette, the hydrocarbons are burned, resulting in the formation of water and carbon dioxide. The contraction in the volume of the sample due to the formation of water, and the amount of carbon dioxide formed, are used as the factors in the calculations to determine the hydrocarbons in the original sample.

Recently, some work has been done in the use of a platinum catalyst to take the place of both the copper oxide tube and the slow combustion pipette. The platinum was used on silica gel which adsorbed significant amounts of hydrocarbons at the temperature required to oxidize hydrogen, giving rise to significant errors because of the adsorption of the hydrocarbons.

In accordance with the present invention, the adsorption of hydrocarbons by silica gel in the use of a platinum catalyst is avoided by using pumice stone as the carrier in place of the silica gel. I have found that by using .125% platinum catalyst on pumice stone, the adsorption of the higher hydrocarbons is eliminated but the oxidation of hydrogen is too slow to be practical. By using higher percentages of platinum catalyst on pumice stone, oxidation of the hydrocarbons took place at 105° C. and I have discovered by experimenting with platinum catalyst containing from .5% to approximately 3% platinum on both silica gel and pumice stone that a catalyst above .125% platinum could be used at approximately 500° C. to determine hydrocarbons in place of the slow combustion pipette. The most rapid results were obtained with a 3% platinum catalyst or higher.

However, inasmuch as this catalyst cannot be used for the determination of hydrogen at 105° C. without oxidation of the hydrocarbons, I have provided a system of using the original copper oxide tube for the determination of hydrogen and carbon monoxide and the platinum catalyst tube on pumice stone or silica gel for the determination of the hydrocarbons.

The method will become more apparent from a consideration of the accompanying drawing constituting a part hereof, in which like reference characters designate like parts, and in which Fig. 1 is a front elevational view of a gas analysis apparatus embodying the principles of this invention;

Fig. 2 a modified form of apparatus embodying the platinum catalyst tube;

Fig. 3 a wiring diagram of a controlled heating element for the copper oxide and platinum catalyst tubes; and Fig. 4 a side elevational view of the U-tubes shown in Fig. 1.

In the precise analysis of the combustible components according to the present invention, other components such as oxygen and carbon dioxide are first removed in the conventional way. The manner in which a complete analysis is made can best be understood from a consideration of Fig. 1 in which the numeral 1 designates a water jacket enclosing a burette 1a, connected by means of a rubber tube to mercury level bulb 2, which is filled with mercury, the burette being connected to a cock 1b, having a valved connection at 3 with a manifold generally designated by the numeral 4 leading to a source of gas samples at 5 or 6 and to the various parts of the gas analysis apparatus. Burette 1a is also connected through cock 1b with a manometer 1c for measuring the pressure of the gas in burette 1a, the other side of the manometer being connected to a closed end tube 1d. Connected to the manifold is a copper oxide tube 7 filled with a catalyst 7a having a resistance heater designated by the dash line and the numeral 8, which as shown in the diagram of Fig. 3 has an adjustable rheostat 9 to maintain a controlled temperature. Also connected to the manifold 4 is a platinum catalyst tube 10 filled with a catalyst 10a having a heater 11 and variable control as shown in Fig. 3, the tube 10 containing a platinum catalyst on pumice stone or silica gel. A plurality of pipettes 12 and 13 and reservoir 14 are connected to the manifold by valves 12a, 13a and 14a, into which the products are drawn for the purpose of the analysis as will be hereinafter described, a leveling bowl or cup 15 being connected to the reservoir 14. The manifold 4 is provided with valve connections 3, 3a and 3b, the valves 3 being three-way valves and the valves 3a and 3b being four-way valves, tubes 7 and 10 being U-tubes, thereby permitting passing of the gases therethrough.

In making the analysis, the burette 1a is first completely filled with mercury by raising leveling tube 2. The sample is then drawn into the burette 1a from 5 or 6 through cocks 4, 3 and 1b by lowering the leveling tube 2. The exact volume of gas is then determined by connecting the burette to manometer 1c and the pressure of the gas in the burette balanced against the pressure of air in tube 1d. In this way the volume of gas in the burette is independent of variation of room temperature because the gas in the burette and the air in the tube 1d are both affected equally by any changes in temperature.

After the exact volume has been obtained the gas sample is then passed into pipette 12 through manifold 4 through cocks 1b, 3a, 3b and 12a, by raising leveling tube 2 and filling the burette with mercury. Pipette 12 contains a solution such as an aqueous solution of potassium hydroxide. This solution reacts with any carbon dioxide in the gas sample. The sample is then drawn back into the burette, by lowering leveling tube 2, and again connected to manometer 1c through cock 1b. The sample is then adjusted to its original pressure by raising leveling tube 2 slightly. The decrease in volume is equal to the carbon dioxide removed and by knowing this decrease in volume and the original volume, the per cent composition can be calculated. The gas sample is then passed into pipette 13 which contains a solution for absorbing the oxygen in the sample and the decrease in volume determined the same as for carbon dioxide.

A plurality of such pipettes with proper solutions may be employed for removing any other components by absorption leaving hydrogen, hydrocarbons, and nitrogen remaining in the sample, for which there are not suitable absorbing solutions. Hydrogen is then determined in the conventional manner by passing through a U-tube 7 containing copper oxide and then to reservoir 14. The temperature of copper oxide tube 7 is maintained at 300° C. by heater 8. At this temperature all the hydrogen is burned to water without affecting the hydrocarbons, according to the following equation:

$$CuO + H_2 \rightarrow Cu + H_2O$$

The water condenses and causes a decrease in volume. The sample is again drawn into the burette and the decrease in volume due to the burning hydrogen again determined and used as the basis for calculating the per cent of hydrogen. The sample is then stored in the reservoir 14 or one of the pipettes and a definite amount of oxygen is then drawn into the burette and measured by the same procedure as that used when the sample was initially obtained. The gas sample is then drawn back into the burette from the reservoir and mixed with the oxygen. The sample and oxygen are then passed from the burette through U-style catalyst tube 10 and thence to reservoir 14. Catalyst tube 10 is filled with the catalyst of the present invention, namely, a platinum catalyst containing from .5% to approximately 3% platinum, which is maintained at approximately 500° C. by means of electric heater 11. As the oxygen and sample are passed over the catalyst, the hydrocarbons are burned to carbon dioxide and water. The gas mixture is passed back and forth between reservoir 14 and burette 1a until all the hydrocarbons are then burned. They are completely burned when no decrease in volume is noted. The decrease in volume due to the water formed is then obtained as before and then the gas is passed into pipette 12 and the amount of carbon dioxide formed is determined. The decrease in volume on burning and the carbon dioxide formed are then used as the basis for calculating the percent of the hydrocarbons present.

Fig. 2 shows a modification of the catalyst unit in which the catalyst tube 17 is straight instead of U-shaped and surrounded by a heater 18. The tube 17 within the region of the heater is filled with a catalyst 17a and is mounted below the control manifold. A reservoir 16 consisting of a double walled vessel, the inner chamber of which communicates with tube 17 and the outer chamber with the atmosphere through a vent 19, is mounted below the straight catalyst tube. Tube 17 is provided with a cock 20 which, when open, permits the gas sample to be stored in the inner chamber of the reservoir 16, which is sealed by the liquid in the outer chamber and which is displaced upward between the wall of the inner and outer chambers when the gas sample is stored therein. It has the equivalent function to the reservoir 14 with the leveling cup 15.

It is evident from the foregoing description of my invention that the use of a small quantity of platinum catalyzer at low temperatures as heretofore proposed, is too slow for hydrocarbons and absorbs significant amounts of hydrocarbons during the determination of hydrogen.

My method, using a higher percentage than .125% platinum catalyzer for hydrocarbons only gives rapid and accurate results, retention of the copper oxide tube for hydrogen and carbon monoxide eliminates the oxidation of the hydrocarbons and speeds up the analysis very substantially. It may be used generally for determining the amount of combustible gases in a gas sample.

Although one embodiment of my invention has been herein illustrated and described, it will be evident to those skilled in the art that various modifications may be made in the details of construction without departing from the principles herein set forth.

I claim:

The method of determining the amount of combustible components in a gas mixture which comprises passing a sample through a copper oxide tube to determine the amount of hydrogen at approximately 300° C., measuring the volume of the remaining sample, mixing it with oxygen, and passing it through a platinum catalyst tube containing from .5% to approximately 3% platinum deposited on a pumice stone carrier at a temperature of from 100° C. to 600° C. to determine the amount of hydrocarbons present in the sample.

LLOYD V. GUILD.

REFERENCES CITED

The following references are of record in the file of this patent:

UNITED STATES PATENTS

| Number | Name | Date |
|---|---|---|
| 1,505,162 | Nowak | Aug. 19, 1924 |
| 2,200,522 | Streicher | May 14, 1940 |
| 2,260,821 | Bendy | Oct. 28, 1941 |

OTHER REFERENCES

Kobe et al., Ind. and Eng. Chem., Anal. ed., vol. 5, No. 2, pages 110–112, March 15, 1933; vol. 6, No. 1, pages 35–37, January 15, 1934; vol. 13, pages 457–459, 1941.

Dennis "Gas Analysis," pages 157–170. Published by MacMillan Co., New York city, 1929.